United States Patent [19]

Borgmeier et al.

[11] 4,182,495
[45] Jan. 8, 1980

[54] GRAPHITE OR CARBON FIBER COMPOSITE STRUCTURE, LOW TEMPERATURE CURE

[75] Inventors: Donald E. Borgmeier; Edward W. Higgs, both of Salt Lake City, Utah

[73] Assignee: The United States of America as represented by the Secretary of the Navy, Washington, D.C.

[21] Appl. No.: 966,238

[22] Filed: Dec. 4, 1978

[51] Int. Cl.² .................... B63H 11/00; B32B 31/00; B32B 7/00; D03D 9/00
[52] U.S. Cl. ......................... 239/265.11; 156/297; 156/299; 156/330; 239/DIG. 19; 428/114; 428/255; 428/294; 428/298; 428/413; 428/902
[58] Field of Search ................ 239/265.11, DIG. 19; 156/297, 299, 330; 428/109, 112, 113, 114, 255, 294, 298, 301, 413, 902

[56] References Cited

U.S. PATENT DOCUMENTS

| | | | |
|---|---|---|---|
| 3,490,983 | 1/1970 | Lee | 428/113 |
| 3,649,435 | 3/1972 | Varlas | 428/902 |
| 3,768,760 | 10/1973 | Jensen | 428/114 |
| 3,826,708 | 7/1974 | Dervy | 428/113 |
| 3,925,587 | 12/1975 | Park | 428/255 |
| 3,953,641 | 4/1976 | Marquis | 428/902 |
| 3,959,544 | 5/1976 | Rogers | 428/294 |
| 3,994,762 | 11/1976 | Wrzesien et al. | 428/902 |
| 4,063,684 | 12/1977 | O'Brien et al. | 239/265.11 |

*Primary Examiner*—William R. Dixon, Jr.
*Attorney, Agent, or Firm*—R. S. Sciascia; Charles D. B. Curry; Francis I. Gray

[57] ABSTRACT

Accordingly the present invention provides a method of construction using a graphite or carbon fiber composite structure with a low temperature cure epoxy resin system to have a material system of minimum weight, high strength and high stiffness which eliminates a secondary bonding operation to effect load transfer between structural components and to have service life compatible to its use environment. A graphite or carbon fiber, preimpregnated with a low temperature (195° F.) curing epoxy resin prepared in the form of unidirectional tape, is laid up or wrapped over a contour form and then cured to provide stiffness and strength equal to or exceeding those of a selected metal such as aluminum or steel.

3 Claims, 4 Drawing Figures

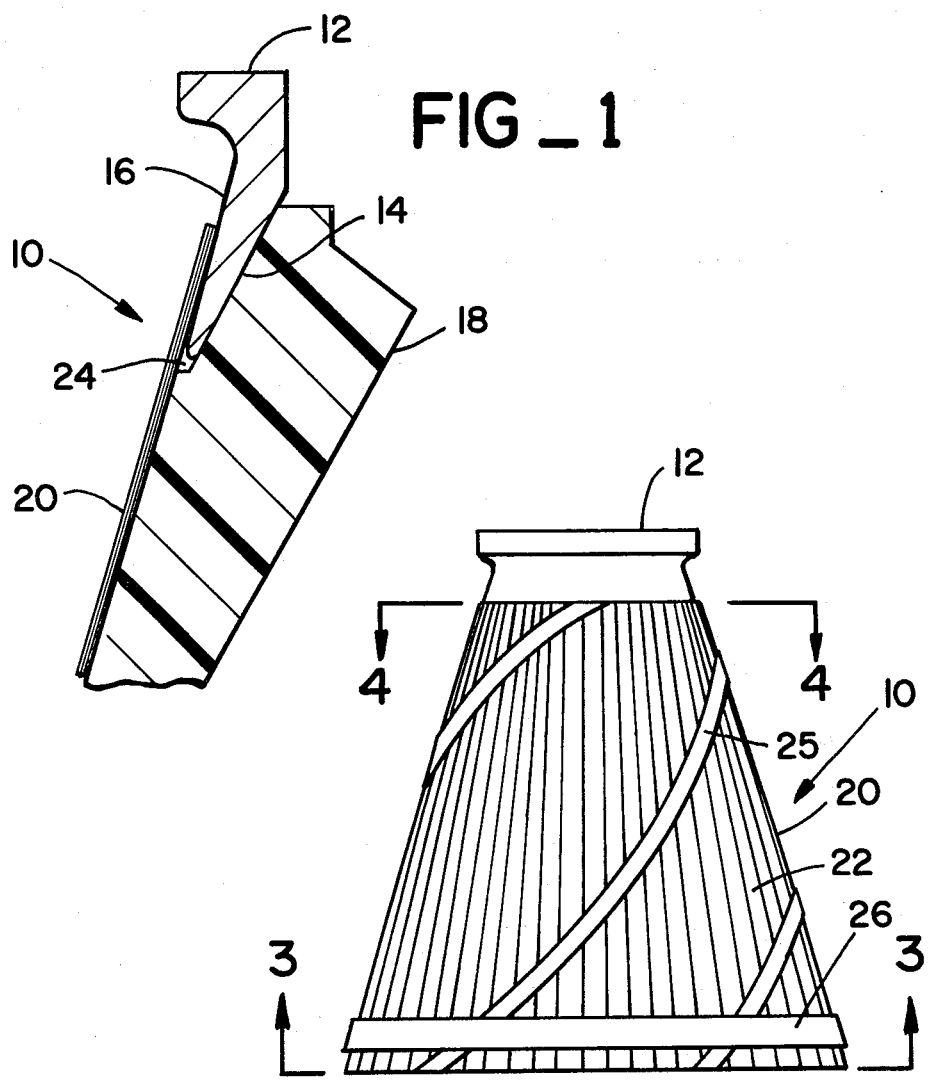
FIG_1
FIG_2
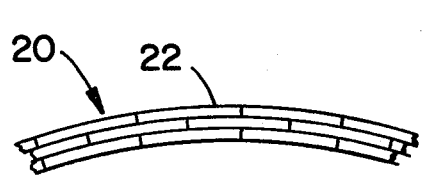
FIG_3
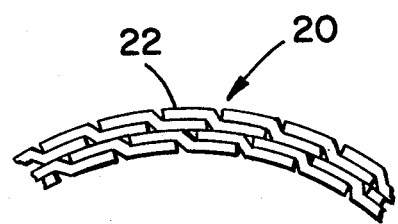
FIG_4

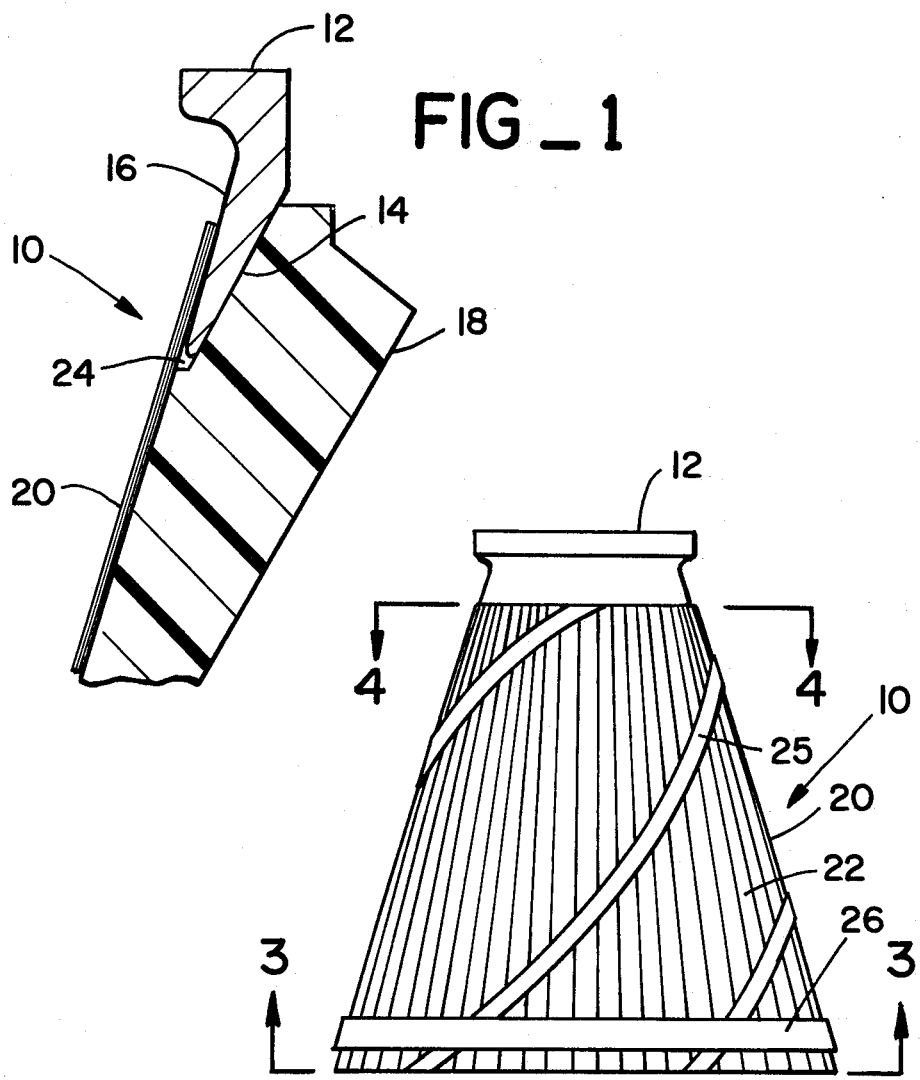
FIG_1
FIG_2
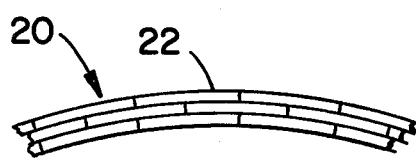
FIG_3
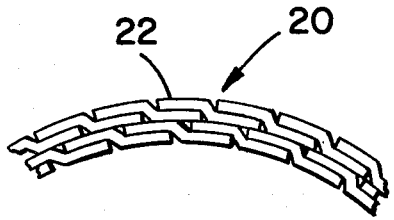
FIG_4

GRAPHITE OR CARBON FIBER COMPOSITE STRUCTURE, LOW TEMPERATURE CURE

BACKGROUND OF THE INVENTION

1. Field of the Invention

The present invention relates to construction methods using fiber tapes, and more particularly to a construction method using a graphite or carbon fiber prepregnated tape having a low temperature cure epoxy resin system.

2. Description of the Prior Art

Exit cones of nozzles for rocket motors have required structural materials, such as forged aluminum alloys, which require long lead times to procure die tooling and receipt of first parts. Often the forgings are designed oversize to provide design flexibility resulting in material waste and additional machining cost over the life expectancy of the selected forging. Forgings are machined on the inside and outside to the desired contours, requiring match machining to the insulator/liner outside surface, and "acid-etched" cleaned to obtain a structural interface bond. These operations are time consuming and expensive, and the bond is not always adequate for load transfer.

SUMMARY OF THE INVENTION

Accordingly the present invention provides a method of construction using a graphite or carbon fiber composite structure with a low temperature cure epoxy resin system to have a material system of minimum weight, high strength and high stiffness, to eliminate a secondary bonding operation to effect load transfer between structural components, and to have a service life compatible to its use environment. A graphite or carbon fiber, preimpregnated with a low temperature (195° F.) curing epoxy resin prepared in the form of unidirectional tape, is laid up or wrapped over a contour form and then cured to provide stiffness and strength equal to or exceeding those of a selected metal such as aluminum or steel. By adding or reducing the amount of fiber laid up, the material system may be easily tailored to variations of design requirements.

Therefore, it is an object of the present invention to provide a construction method having a material system of minimum weight, high strength and high stiffness.

Another object of the present invention is to provide a construction method which eliminates a secondary bond to effect load transfer between structural components.

Yet another object of the present invention is to provide a construction method which is quicker, less expensive, and has less material waste.

Other objects, advantages and novel features will be apparent from the following detailed description when read in view of the appended claims and attached drawing.

BRIEF DESCRIPTION OF THE DRAWING

FIG. 1 is a cross-sectional view of a portion of a rocket nozzle constructed according to the present invention.

FIG. 2 is a plan view of a rocket nozzle constructed according to the present invention.

FIG. 3 is an end view of the net layup taken along line 3—3 of FIG. 2.

FIG. 4 is an end view of the net layup taken along line 4—4 of FIG. 2.

BRIEF DESCRIPTION OF THE PREFERRED EMBODIMENT

Referring now to FIGS. 1 and 2 a rocket nozzle 10 is shown. An adaptor 12 in the form of an annular member has an inner surface 14 and an outer surface 16. An exit cone, or insulator/liner, 18 is bonded at one end to the interior surface 14 of the adaptor 12. A net 20 formed of a lay up or winding of a unidirectional graphite or high-modulus carbon fiber tape 22 having a low temperature cure epoxy resin system, also called a prepreg tape, surrounds the exterior of the exit cone 18 as well as overlapping the outer surface 16 of the adaptor 12. The prepreg tape 22 has a resin content of from 34 to 45 percent by weight. When cured the net 20 is bonded securely to both the exit cone 18 and the adaptor 12 and has a strength equal to or greater than aluminum or steel. The adaptor 12 is typically 6AL-4V tilanium, while the insulator/liner 18 is a graphite fabric reinforced prepreg filled with phenolic resin.

The rocket nozzle 10 is constructed by first smoothing and cleaning the bonding surfaces 14, 16 of the adaptor 12. An adhesive film such as FM-73 is wrapped around the exit cone 18 and the adaptor 12 is slipped onto the exit cone. The adaptor 12/exit cone 18 combination is cured and any voids 24 are filled with adhesive such as EA-934 to provide a flush surface between the outside surface 16 of the adaptor and the surface of the exit cone. FM-73 is a proprietary blend of epoxy resins and rubber, modified and coated on a polyester knit fabric, high temperature curing. EA-934 is a modified epoxy cured with a polyamide/aliphatic amine, ambient curing.

A resin, of similar cure characteristics as the epoxy resin system of the prepreg tape 22—such as X-48 or EF-715, a modified bisphenol-A/epichlorohydrin-phenol/formaldehyde co-resin epoxy, low temperature curing—, is applied to the outer surface of the adaptor 12/exit cone 18 combination. Strips of prepreg tape 22 are cut to length and laid up on the outer surface of the adaptor 12/exit cone 18 combination such that the edges butt together at the aft end as shown in FIG. 3 and gradually overlap as advanced to the forward end as shown in FIG. 4. Each layer progresses in the opposite direction of the previous layer until the requisite number of layers has been applied, with each successive layer starting at the midpoint of the previous strip of prepreg tape 22. Layers of helical strips 25 may be wrapped, with each layer overwrapped in the opposite direction to the previous layer. A hoop 26 may also be built up near the aft end of the net 20.

The resulting rocket nozzle 10 is then prepared for curing of the net structure 20 by overwrapping the entire external surface with a vacuum blanket and placing in an autoclave for curing. Curing is attained at a low temperature, approximately 195° F. for one type of prepreg tape 22, under a pressure of approximately 100 p.s.i. while maintaining a 25 in. Hg. vacuum of the vacuum blanket. After curing the rocket nozzle 10 is removed from the autoclave and machined as necessary to produce the final design configuration.

Although described in terms of a rocket nozzle, the present invention may be used for many other applications. By taking advantage of the unidirectional properties of the prepreg tape design flexibility is achieved, since material construction can be laid up in any net configuration over the desired contour and tailored for specific strength or specific moduli design requirements. The cured material results in a structural component which automatically provides the structural bond, eliminating a secondary bond, between the graphite or carbon epoxy matrix and the underlying form.

What is claimed is:

1. A rocket nozzle exit cone subassembly comprising:
   (a) an adaptor of annular configuration;
   (b) an exit cone bonded to the inner surface of said adaptor; and
   (c) a net of preimpregnated carbon fiber tape, said tape having a low temperature cure epoxy resin system, wrapped about said exit cone and said adaptor so that when cured said net is firmly bonded to said exit cone and said adaptor.

2. A rocket nozzle exit cone subassembly as recited in claim 1 wherein said preimpregnated carbon fiber tape comprises unidirectional, continuous filaments of a material selected from the group consisting of high modulus graphite and high strength carbon reinforcing said low temperature cure epoxy resin system, the resin content of said preimpregnated carbon fiber tape being from 34 to 45 percent by weight.

3. A construction method comprising the steps of:
   (a) applying a low temperature cure epoxy resin to the surface of a material combination;
   (b) laying up a plurality of strips of a preimpregnated carbon fiber tape, said tape having a low temperature cure epoxy resin system, to form a predetermined net about said material combination; and
   (c) curing said material combination with said net at a low temperature.

* * * * *